(12) United States Patent
Bao et al.

(10) Patent No.: US 11,907,852 B2
(45) Date of Patent: *Feb. 20, 2024

(54) SYSTEMS AND METHODS FOR GENERATING A NEURAL NETWORK MODEL FOR IMAGE PROCESSING

(71) Applicant: SHANGHAI UNITED IMAGING HEALTHCARE CO., LTD., Shanghai (CN)

(72) Inventors: Yuan Bao, Shanghai (CN); Guotao Quan, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,340

(22) Filed: Mar. 6, 2023

(65) Prior Publication Data
US 2023/0222346 A1 Jul. 13, 2023

Related U.S. Application Data

(63) Continuation of application No. 16/233,200, filed on Dec. 27, 2018, now Pat. No. 11,599,796, which is a
(Continued)

(51) Int. Cl.
*G06N 3/084* (2023.01)
*G06T 5/00* (2006.01)
(Continued)

(52) U.S. Cl.
CPC ........... *G06N 3/084* (2013.01); *G06F 18/214* (2023.01); *G06N 3/045* (2023.01); *G06N 3/098* (2023.01);
(Continued)

(58) Field of Classification Search
None
See application file for complete search history.

(56) References Cited

U.S. PATENT DOCUMENTS

| 10,552,968 B1 | 2/2020 | Wang et al. |
| 2004/0107244 A1 | 6/2004 | Kuo et al. |

(Continued)

FOREIGN PATENT DOCUMENTS

| CN | 105930774 A | 9/2016 |
| CN | 106709565 A | 5/2017 |

(Continued)

OTHER PUBLICATIONS

International Search Report in PCT/CN2018/109135 dated Apr. 30, 2019, 4 pages.
(Continued)

*Primary Examiner* — Frank S Chen
(74) *Attorney, Agent, or Firm* — METIS IP LLC

(57) ABSTRACT

The disclosure relates to a system and a method for generating a neural network model for image processing by interacting with at least one client terminal. The method may include receiving via a network, a plurality of first training samples from the at least one client terminal. The method may also include training a first neural network model based on the plurality of first training samples to generate a second neural network model. The method may further include transmitting, via the network, the second neural network model to the at least one client terminal.

20 Claims, 9 Drawing Sheets

Related U.S. Application Data continuation of application No. PCT/CN2018/109135, filed on Sep. 30, 2018.

(51) Int. Cl.

| | |
|---|---|
| *G06T 7/00* | (2017.01) |
| *G06F 18/214* | (2023.01) |
| *G06N 3/045* | (2023.01) |
| *G06V 10/764* | (2022.01) |
| *G06V 10/776* | (2022.01) |
| *G06V 10/82* | (2022.01) |
| *G06N 3/098* | (2023.01) |

(52) U.S. Cl.
CPC ............ *G06T 5/002* (2013.01); *G06T 7/0012* (2013.01); *G06V 10/764* (2022.01); *G06V 10/776* (2022.01); *G06V 10/82* (2022.01); *G06T 2207/20081* (2013.01); *G06T 2207/20084* (2013.01)

(56) References Cited

U.S. PATENT DOCUMENTS

| | | |
|---|---|---|
| 2005/0157848 A1 | 7/2005 | Miyauch et al. |
| 2017/0116498 A1* | 4/2017 | Raveane .............. G06V 10/454 |
| 2017/0161592 A1 | 6/2017 | Su et al. |
| 2020/0250821 A1 | 8/2020 | Peng et al. |
| 2020/0356805 A1 | 11/2020 | Sun et al. |

FOREIGN PATENT DOCUMENTS

| | | |
|---|---|---|
| CN | 106709917 A | 5/2017 |
| CN | 107256423 A | 10/2017 |
| CN | 107977707 A | 5/2018 |
| CN | 108229534 A | 6/2018 |
| KR | 20180082764 A | 7/2018 |

OTHER PUBLICATIONS

Written Opinion in PCT/CN2018/109135 dated Apr. 30, 2019, 5 pages.

* cited by examiner

SYSTEMS AND METHODS FOR GENERATING A NEURAL NETWORK MODEL FOR IMAGE PROCESSING

CROSS-REFERENCE TO RELATED APPLICATION

This application is a continuation of U.S. patent application Ser. No. 16/233,200, filed on Dec. 27, 2018, which is a Continuation of International Application No. PCT/CN2018/109135, filed on Sep. 30, 2018, the contents of each of which are incorporated herein by reference.

TECHNICAL FIELD

The disclosure generally relates to medical image processing, and more specifically relates to systems and methods for determining a neural network model for image processing.

BACKGROUND

Medical imaging systems, such as a CT system, a PET system, an MRI system, are typically used for clinical examinations and medical diagnoses. The medical imaging system(s) may scan an object to generate scanning data, and further reconstruct one or more images based on the scanning data. The reconstructed image(s) should be further processed. The processing of the reconstructed image(s) may include image denoising, image enhancement, image super-resolution processing, image artifact removing, etc. Generally, the processing of a reconstructed image may be performed by a client terminal (e.g., a computer). Nowadays, with the development of machine learning, a reconstructed image can be processed using a trained neural network model. The trained neural network model may be generated and/or updated by the client terminal via training a neural network model. However, the training and/or updating of the neural network model may require strong computing capacity, which may occupy a large number of computing resource (e.g., CPUs) on the client terminal if the neural network model is trained on the client terminal. Thus, it is desirable to provide a method and a system for training a neural network model that does not occupy or occupies less computing resources of the client terminal.

SUMMARY

According to an aspect of the present disclosure, a system for generating a neural network model for image processing by interacting with at least one client terminal is provided. The system may include a network configured to facilitate communication of at least one server device in the system and the at least one client terminal. The at least one server device includes at least one processor and at least one storage device storing a set of instructions, the at least one processor being in communication with the at least one storage device. When the executable instructions are executed, the executable instructions may cause the system to implement a method. The method may include receiving via a network, a plurality of first training samples from the at least one client terminal. The method may also include training a first neural network model based on the plurality of first training samples to generate a second neural network model. The method may further include transmitting, via the network, the second neural network model to the at least one client terminal.

In some embodiments, each of the plurality of first training samples may include a first initial image and a first processed image with respect to the first initial image, the first processed image being generated by the at least one client terminal via processing the first initial image.

In some embodiments, the first processed image may be generated by the at least one client terminal via processing the first initial image using a third neural network model.

In some embodiments, each of the plurality of first training samples may include a first initial image, and to train a first neural network model based on the plurality of first training samples, the at least one processor may be further configured to cause the system to for each of the plurality of first training samples, process the first initial image to obtain a first processed image, and train the first neural network model based on the plurality of first training samples and a plurality of first processed images corresponding to the plurality of first training samples, respectively.

In some embodiments, the at least one processor is further configured to cause the system to receive via the network, a first test result of the second neural network model from the at least one client terminal, and determine the second neural network model as a target neural network model for image processing in response to a determination that the first test result satisfies a first condition In some embodiments, the first test result of the second neural network model may include an evaluation score of the second neural network model, and the at least one processor is further configured to cause the system to determine whether the evaluation score of the second neural network model is greater than a threshold and determine that the first test result satisfies the first condition in response to a determination that the evaluation score of the second neural network model is greater than the threshold.

In some embodiments, the evaluation score of the second neural network model may be determined by evaluating one or more first test images according to one or more quality parameters relating to each of the one or more test images. The one or more test images may be generated by the at least one client terminal via processing one or more second initial images using the second neural network model, and the one or more quality parameters may include at least one of a noise level, a resolution, a contrast ratio, or an artifact level.

In some embodiments, the one or more quality parameters relating to the one or more test images may be evaluated by the at least one client terminal using an analytic hierarchy process (AHP).

In some embodiments, the at least one processor may be further configured to cause the system to receive, via the network, the one or more second initial images and the one or more test images from the at least one client terminal in response to the determination that the test result satisfies the first condition, and update the plurality of first training samples with the received one or more second initial images and the one or more test images.

In some embodiments, the at least one processor may be further configured to cause the system to in response to a determination that the first test result does not satisfy the first condition, determine the first neural network model as the target neural network model for image processing.

In some embodiments, the at least one processor may be further configured to cause the system to transmit the target neural network model to the at least one client terminal over the network.

In some embodiments, the at least one processor may be further configured to cause the system to obtain a second test result for the target neural network model from the at least one client terminal, determine whether the target neural network model needs to be updated based on the second test result, and train the target neural network model using a plurality of second training samples to obtain a trained target neural network model in response to a determination that the second test result of the target neural network model does not satisfy a second condition.

In some embodiments, the at least one processor is further configured to cause the system to obtain the second test result for the target neural network model periodically, or obtain the second test result for the target neural network model in response to a request to update the target neural network model received from the at least one client terminal.

In some embodiments, the target neural network model for image processing may be used for at least one of image denoising, image enhancement, image super-resolution processing, image artifact removing, image diagnosis, or image identification.

In some embodiments, the system may further comprise a plurality of server devices distributed connected to the network. Each of the plurality of server devices may be configured to provide a corresponding neural network model for image processing including at least one of image denoising, image enhancement, image super-resolution processing, image artifact removing, image diagnosis, or image identification.

According to another aspect of the present disclosure, a system for generating a neural network model for image processing is provided. The system may include at least one client terminal, at least one server; and a network configured to facilitate communication between the at least one client terminal and the at least one server device in the system. The at least one server device may include at least one processor and at least one storage device storing a set of instructions, the at least one processor being in communication with the at least one storage device. When the executable instructions are executed, the executable instructions may cause the system to implement a method. The method may include receiving, by the at least one processor, a plurality of first training samples from the at least one client terminal. The method may also include training, by the at least one processor, a first neural network model using the plurality of first training samples to generate a second neural network model and transmitting, by the at least one processor, the second neural network model to the at least one client terminal. The method may further include generating, by the at least one client terminal, a first test result of the second neural network model received from the at least one server device and determining, by the at least one processor, the second neural network model as a target neural network model for image processing in response to a determination that the first test result satisfies a first condition.

According to another aspect of the present disclosure, a method for generating a neural network model for image processing by interacting with at least one client terminal is provided. The method may be implemented on a computing device having one or more processors and a computer-readable storage medium. The method may include receiving via a network, a plurality of first training samples from the at least one client terminal. The method may also include training a first neural network model based on the plurality of first training samples to generate a second neural network model. The method may further include transmitting, via the network, the second neural network model to the at least one client terminal.

According to another aspect of the present disclosure, a non-transitory computer readable medium may include instructions. When executed by at least one processor, the executions may cause the at least one processor to implement a method. The method may be implemented on a computing device having one or more processors and a computer-readable storage medium. The method may include receiving via a network, a plurality of first training samples from the at least one client terminal. The method may also include training a first neural network model based on the plurality of first training samples to generate a second neural network model. The method may further include transmitting, via the network, the second neural network model to the at least one client terminal.

According to another aspect of the present disclosure, a method for generating a neural network model for image processing is provided. The method may be implemented on a system including a computing device having one or more processors and a computer-readable storage medium and at least one client terminal. The method may include receiving, by the at least one processor, a plurality of first training samples from the at least one client terminal. The method may also include training, by the at least one processor, a first neural network model using the plurality of first training samples to generate a second neural network model and transmitting, by the at least one processor, the second neural network model to the at least one client terminal. The method may further include generating, by the at least one client terminal, a first test result of the second neural network model received from the at least one server device and determining, by the at least one processor, the second neural network model as a target neural network model for image processing in response to a determination that the first test result satisfies a first condition.

According to another aspect of the present disclosure, a non-transitory computer readable medium may include instructions. When executed by at least one processor, the executions may cause the at least one processor to implement a method. The method may include receiving, by the at least one processor, a plurality of first training samples from the at least one client terminal. The method may also include training, by the at least one processor, a first neural network model using the plurality of first training samples to generate a second neural network model and transmitting, by the at least one processor, the second neural network model to the at least one client terminal. The method may further include generating, by the at least one client terminal, a first test result of the second neural network model received from the at least one server device and determining, by the at least one processor, the second neural network model as a target neural network model for image processing in response to a determination that the first test result satisfies a first condition.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Figure 2:
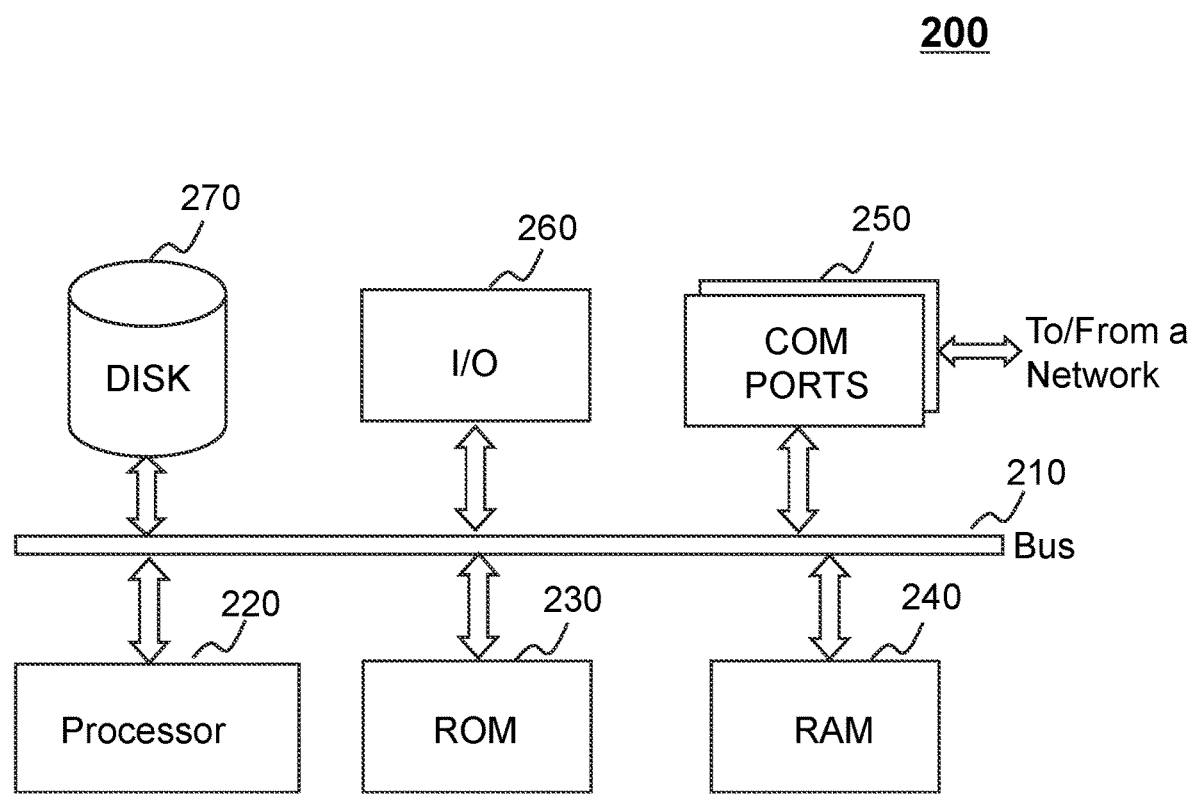
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The disclosure relates to systems and methods for determining a target neural network model for image processing. In the present disclosure, the target neural network model may be generated via a server device, and may be tested via a client terminal. The server device may have a stronger computing capacity than the client terminal, which may shorten the time of training the target neural network model and may not need to occupy computing resources (e.g., CPUs) of the client terminal. The client terminal may store a plurality of reconstructed image(s), which may be convenient to test the target neural network model. To determine the target neural network model, the systems and methods may receive a plurality of training samples from at least one client terminal via a network. The systems and methods may train a first neural network model based on the plurality of training samples to generate a second neural network model. The systems and methods may transmit the second neural network model to the at least one client terminal via the network, and receive a test result of the second neural network model from the at least one client terminal via the network. The systems and methods may determine the second neural network model as the target neural network model for image processing in response to a determination that the test result satisfies a condition. The target neural network model for image processing may be used for at least one of image denoising, image enhancement, image super-resolution process, image artifact removing, image diagnosis, or image identification. In some embodiments, a plurality of server devices may be distributed connected to the network. Each of the plurality of server devices may be configured to provide a corresponding neural network model for image processing including at least one of image denoising, image enhancement, image super-resolution processing, image artifact removing, image diagnosis, or image identification.

Figure 1A:
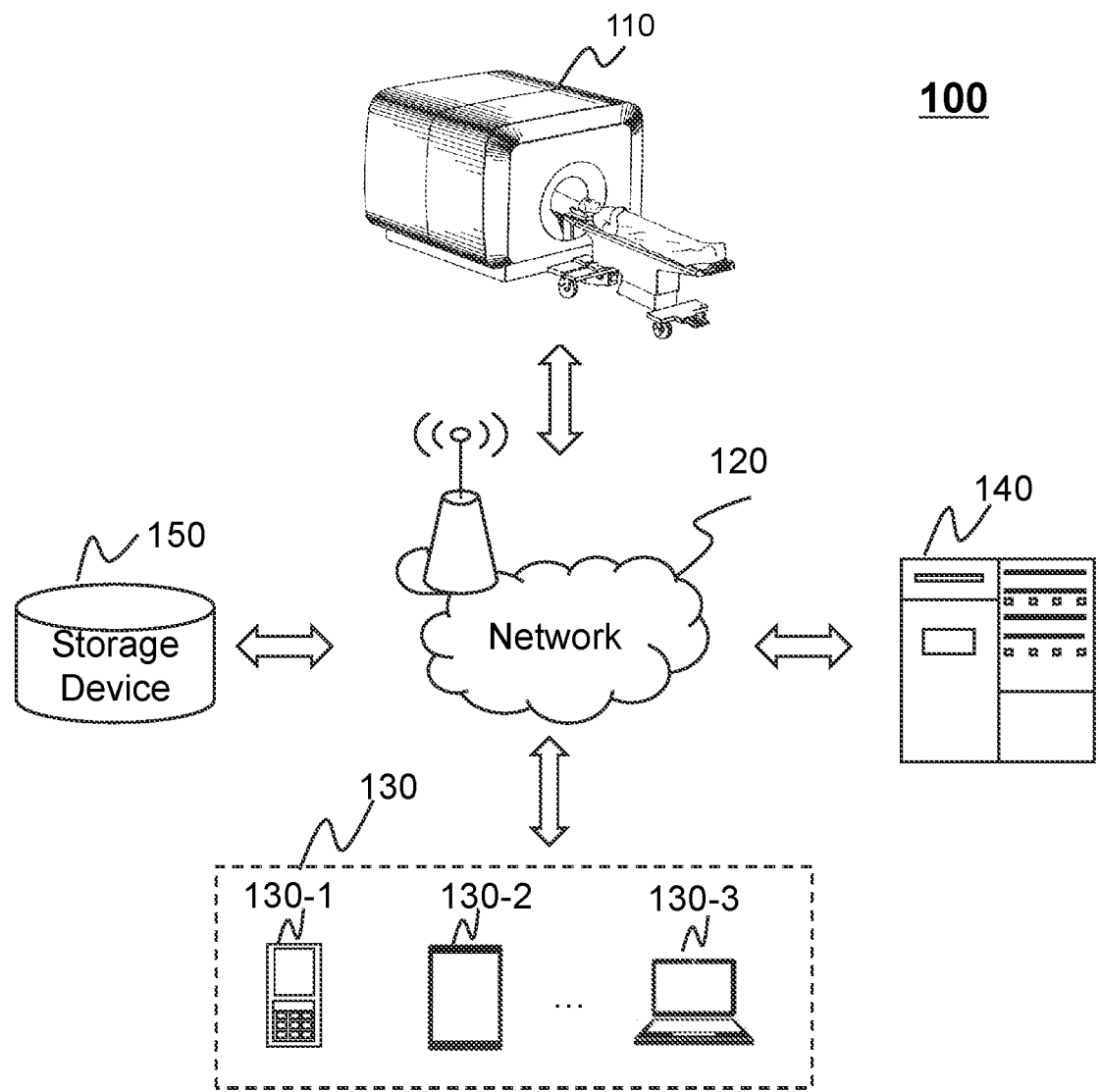
FIG. 1A is a schematic diagram illustrating an exemplary medical system according to some embodiments of the present disclosure.

FIG. 1A is a schematic diagram illustrating an exemplary medical system according to some embodiments of the present disclosure. In some embodiments, the medical system 100 may be a single-modality system or a multi-modality system. Exemplary single-modality systems may include a computed tomography (CT) system, a computed tomography angiography (CTA) system, a digital radiography (DR) system, a positron emission tomography (PET) system, a single photon emission computed tomography (SPECT) system, a magnetic resonance imaging (MRI) system, a radiation therapy (RT) system, etc. Exemplary multi-modality systems may include a CT-PET system, a MRI-PET system, etc. In some embodiments, the medical system 100 may include modules and/or components for performing imaging and/or related analysis.

Merely by way of example, as illustrated in FIG. 1, the medical system 100 may include a medical device 110, a network 120, one or more client terminals 130, a server device 140, and a storage device 150. The components in the medical system 100 may be connected in various ways. Merely by way of example, the medical device 110 may be connected to the client terminal(s) 130 directly or through the network 120. As another example, the medical device 110 may be connected to the server device 140 directly or through the network 120. As a further example, the client terminal(s) 130 may be connected to another component of the medical system 100 (e.g., the server device 140) via the network 120. As still a further example, the storage device 150 may be connected to another component of the medical system 100 (e.g., the medical device 110, the client terminal(s) 130, the server device 140) directly or through the network 150.

The medical device 110 may acquire imaging data relating to at least one part of an object. The imaging data relating to at least one part of an object may include an image (e.g., an image slice), projection data, or a combination thereof. In some embodiments, the imaging data may be a two-dimensional (2D) imaging data, a three-dimensional (3D) imaging data, a four-dimensional (4D) imaging data, or the like, or any combination thereof. The object may be a biological object (e.g., a patient, an animal) or a non-biological object (e.g., a man-made object). In some embodiments, the medical device 110 may include an imaging device, an interventional medical device, or the like. Exemplary imaging devices may include a PET scanner, a CT scanner, a DR scanner, a MRI scanner, or the like, or a combination thereof. Exemplary interventional medical devices may include a radiation therapy (RT) device, an ultrasound treatment device, a thermal treatment device, a surgical intervention device, or the like, or a combination thereof.

The network 120 may facilitate exchange of information and/or data for the medical system 100. In some embodiments, one or more components of the medical system 100 (e.g., the medical device 110, the client terminal(s) 130, the server device 140, or the storage device 150) may communicate information and/or data with one or more other components of the medical system 100 via the network 120. For example, the client terminal(s) 130 and/or the server device 140 may obtain scanning data from the medical device 110 via the network 120. As another example, the server device 140 may obtain user instructions from the client terminal(s) 130 via the network 120.

In some embodiments, the network 120 may have a distributed network architecture. In some embodiments, the medical system 100 may include a plurality of server devices distributed connected to the network 120. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the medical system 100 may be connected to the network 120 to exchange data and/or information.

The client terminal(s) 130 may include a mobile device 130-1, a tablet computer 130-2, a laptop computer 130-3, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc.

In some embodiments, the client terminal(s) 130 may receive information and/or instructions inputted by a user, and send the received information and/or instructions to the medical device 110 or the server device 140. For example, the client terminal(s) 130 may send a scan instruction to the medical device 110 to proceed a scan on the object. As another example, the client terminal(s) 130 may send a reconstruction instruction to the server device 140 to proceed reconstruction of images related to the object. Alternatively or additionally, the client terminal(s) 130 may receive data and/or information from the medical device 110 or the server device 140. For example, the client terminal(s) 130 may receive scanning data generated by the medical device 110. As another example, the client terminal(s) 130 may receive a reconstructed image from the server device 140. In some embodiments, the client terminal(s) 130 may be part of the server device 140.

In some embodiments, the client terminal(s) 130 may be a computer and perform partial functions of the server device 140. For example, the client terminal(s) 130 may process data related to the object (e.g., basic information of the object, medical information, etc.). The processing of the data related to the object may include addition, deletion, ranking, screening, analyzing, or the like, or any combination thereof. As another example, the client terminal(s) 130 may process image data (e.g., an image) and/or scanning data (e.g., projection data). The processing of the image data and/or the scanning data may include image reconstruction, image segmentation, image amplification, image reduction, image denoising, image enhancement, image super-resolution processing, image artifact removing, image diagnosis, image identification, or the like, or any combination thereof. Merely by way of example, the client terminal(s) 130 may reconstruct an image of the object based on the scanning data. In some embodiments, the client terminal(s) 130 may generate a denoised image by processing an initial image using, for example, a neural network model for image denoising. The client terminal(s) 130 may evaluate one or more quality parameters relating to the denoised image using an analytic hierarchy process (AHP), and further determine an evaluation score of the neural network model for image denoising. In some embodiments, the client terminal(s) 130 may transmit the evaluation score of the neural network model for image denoising to the server device 140. The server device 140 may determine whether the neural network model for image denoising needs to be updated or replaced. The server device 140 may update the neural network model for image denoising using a plurality of training samples.

In some embodiments, the server device 140 may be a computer, a user console, a single server or a server group, etc. The server group may be centralized or distributed. In some embodiments, the server device 140 may be local or remote. For example, the server device 140 may access information and/or data stored in the medical device 110, the client terminal(s) 130, and/or the storage device 150 via the network 120. As another example, the server device 140 may be directly connected to the medical device 110, the client terminal(s) 130 and/or the storage device 150 to access stored information and/or data. In some embodiments, the server device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The server device 140 may process data and/or information obtained from the medical device 110, the client terminal(s) 130, and/or the storage device 150. For example, the server device 140 may obtain scanning data (e.g., projection data) from the medical device 110, and reconstruct an image of the object based on the scanning data. As another example, the server device 140 may obtain a plurality of training samples from client terminal(s) 130 and generate a trained neural network model for image processing, including image denoising, image enhancement, image super-resolution processing, image artifact removing, image diagnosis, or image identification. In some embodiments, the server device 140 may be a server group, including a plurality of server devices distributed connected to the network 120. Each of the plurality of server devices may be configured to provide a corresponding neural network model for image processing, including image denoising, image enhancement, image super-resolution processing, image artifact removing, image diagnosis, or image identification. In some embodiments, the server device 140 may be implemented on a computing device 200 having one or more components as illustrated in FIG. 2. Detailed descriptions of the server device 140 may be found elsewhere in the present disclosure (e.g., FIG. 1B, and the descriptions thereof).

The storage device 150 may store data, instructions, and/or any other information. In some embodiments, the storage device 150 may store data or information obtained from the medical device 110, the client terminal(s) 130 and/or the server device 140. For example, the storage device 150 may store scanning data generated by the medical device 110. As another example, the storage device 150 may store processed image(s) received from the client terminal(s) 130 and/or the server device 140. As a further example, the storage device 150 may store trained neural network model(s) generated by the server device 140. In some embodiments, the storage device 150 may store data and/or instructions that the client terminal(s) 130 and/or server device 140 may execute or use to perform exemplary methods/systems described in the present disclosure. In some embodiments, the storage device 150 may include a mass storage device, removable storage device, a volatile read-and-write memory, read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components in the medical system 100 (e.g., the medical device 110, the server device 140, the client terminal(s) 130, etc.). One or more components in the medical system 100 may access the data or instructions stored in the storage device 150 via the network 120. In some embodiments, the storage device 150 may be directly connected to or communicate with one or more other components in the medical system 100 (e.g., the medical device 110, the server device 140, the client terminal(s) 130, etc.). In some embodiments, the storage device 150 may be part of the server device 140.

It should be noted that the above description of the medical system 100 is merely provided for the purposes of illustration, and not intended to limit the scope of the present disclosure. For persons having ordinary skills in the art, multiple variations and modifications may be made under the teachings of the present disclosure. For example, the assembly and/or function of the medical system 100 may be varied or changed according to specific implementation scenarios. Merely by way of example, some other components may be added into the medical system 100, such as a power supply module that may supply power to one or more components of the medical system 100, and other devices or modules.

Figure 1B:
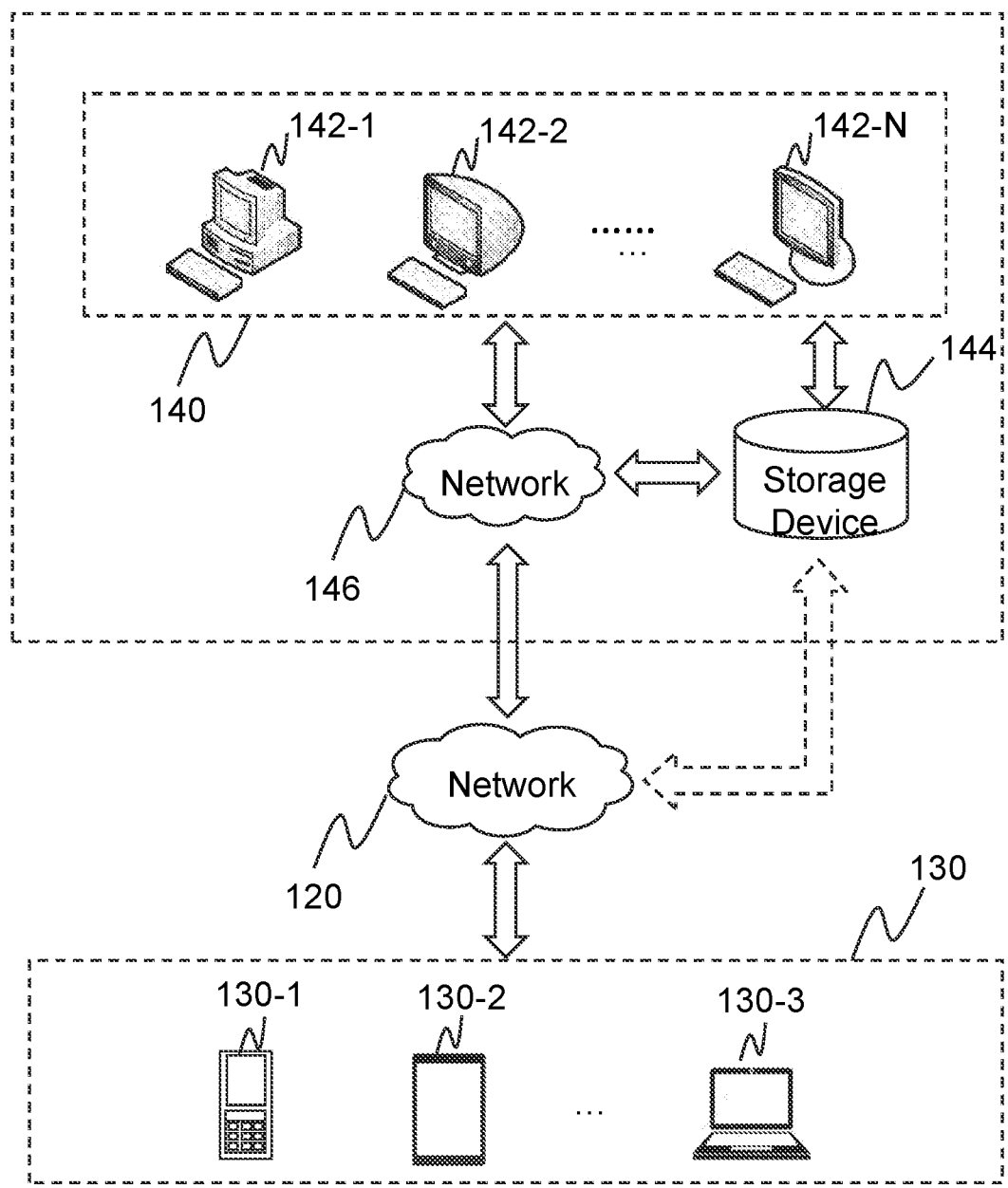
FIG. 1B is a schematic diagram illustrating an exemplary medical system according to some embodiments of the present disclosure.

FIG. 1B is a schematic diagram illustrating an exemplary medical system according to some embodiments of the present disclosure. As illustrated in FIG. 1B, the medical system 200 may include a plurality of server devices 140 such as a server device 142-1, a server device 142-2, . . . , a server device 142-N, etc. In some embodiments, at least one of the plurality of sever devices may provide computing services for image processing (e.g., image reconstruction, image segmentation, etc.) as described elsewhere in the present disclosure. In some embodiments, one server device may be configured to train and/or generate a single one type of neural network model for image processing. For example, the server device 142-1 may be configured to train and generate a neural network model for image denoising, the server device 142-2 may be configured to train and/or generate a neural network for image enhancement, etc. Alternatively, one server device may be configured to train and/or generate more than one type of neural network model for image processing. For example, the server device 142-N may be configured to train and/or generate a neural network model for image denoising, a neural network model for image enhancement, a neural network model for image artifact removing, a neural network model for image super-resolution processing, etc.

Figure 5:
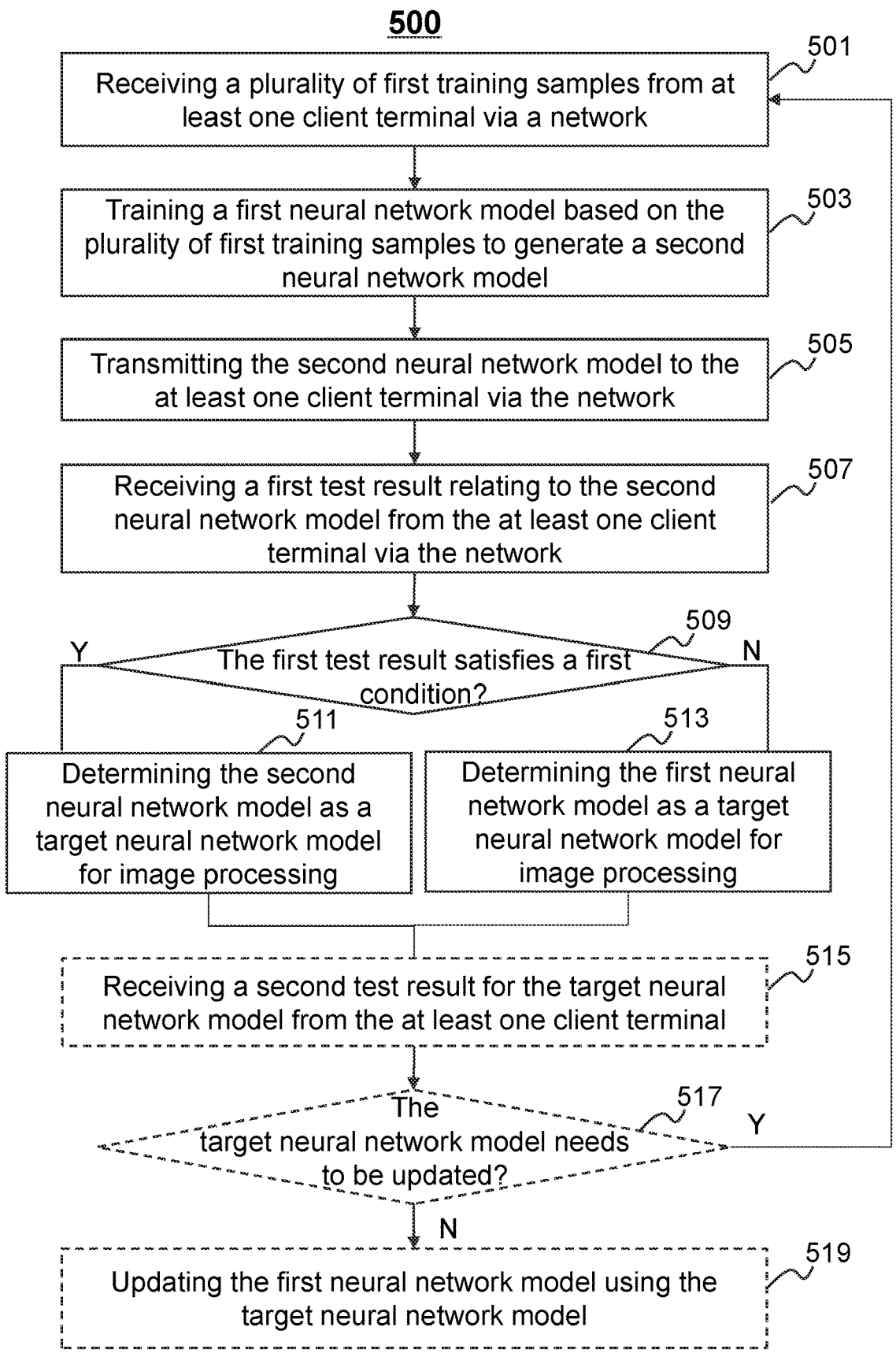
FIG. 5 is a flowchart illustrating an exemplary process for determining a neural network model for image processing according to some embodiments of the present disclosure.

In some embodiments, a server device (e.g., the server device 142-1) may train a preliminary neural network model (e.g., the first neural network model as described in FIG. 5) using a plurality of training samples to determine a trained neural network model (e.g., the second neural network model as described in FIG. 5). The server device (e.g., the server device 142-1) may determine the trained neural network model as a target neural network model for image processing in response to a determination that a test result of the trained neural network model satisfies a condition. In some embodiments, the server device (e.g., the server device 142-1) may update the target neural network model by updating the plurality of training samples if the target neural network model needs to be updated.

In some embodiments, a server device (e.g., the server device 142-1) may be any suitable computer(s), such as a laptop, a tablet computer, a desktop, etc. Each of the plurality of server devices 140 may include at least one processor. The at least one processor may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

The plurality of server devices 140 may be distributed connected to the network 146. In some embodiments, the plurality of server devices 140 may be connected to and/or communicate with each other via the network 146 (e.g., a wireless connection, a wired connection, or a combination thereof). Alternatively, at least one of the plurality of server devices 140 may be connected to and/or communicate with other server device(s) directly. For example, the server device 142-1 may be connected to the server device 142-2 directly. The client terminal(s) 130 may be connected to or communicate with one of the plurality of server device(s) 140 via the network 120 (or the network 146). The client terminal(s) 130 may also be connected to the storage device 144 via the network 120 as indicated by the dotted arrow in FIG. 1B. In some embodiments, the storage device 144 may be connected to at least one of the plurality of server devices 140 directly as indicated by the solid arrow in FIG. 1B. Alternatively, the storage device 144 may be connected to at least one of the plurality of server devices 140 via the network 146.

In some embodiments, the network 146 may include any suitable network (e.g., a wide area network (WAN), a local area network (LAN), wired and/or wireless network access points, etc.) that can facilitate the exchange of information and/or data for the server device(s) 140. Merely by way of example, the network 146 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. It should be noted that, in some embodiments, the network 146 may be omitted.

In some embodiments, the storage device 144 may store data, instructions, and/or any other information. For example, the storage device 144 may store data obtained from the client terminal(s) 130 and/or at least one of the plurality of server devices 140. As another example, the storage device 144 may store algorithms and/or instructions that at least one of the plurality of server devices 140 may execute or use to perform exemplary medical applications described in the present disclosure. As a further example, the storage device 144 may store trained neural network model(s) generated by at least one of the plurality of server devices 140.

It should be noted that the above description of the server device 140 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, at least two components of the plurality of server devices 140 may be integrated into a console. As another example, some other components/modules may be added into the computing cluster, such as a network switch, a workflow network server, etc. In some embodiments, the storage device 144 may be integrated into one or more of the plurality of server devices 140. In some embodiments, the network 146 may be omitted.

FIG. 2 is a schematic diagram illustrating exemplary hardware and/or software components of a computing device according to some embodiments of the present disclosure. In some embodiments, the server device 140 and/or the client terminal(s) 130 may be implemented on the computing device 200 and configured to perform functions thereof disclosure in the present disclosure.

The computing device 200 may be a general purpose computer or a special purpose computer. Both may be used to implement the medical system 100 of the present disclosure. For example, the server device 140 of the medical system 100 may be implemented on the computing device 200, via its hardware, software program, firmware, or a combination thereof. In FIG. 2, only one such computing device is shown purely for convenience. One of ordinary skill in the art would understood at the time of filing of this application that the computer functions relating to the medical system 100 as described herein may be implemented in a distributed manner on a number of similar devices/platforms, to distribute the computing load.

The computing device 200, for example, may include COM ports 250 connected to and from a network (e.g., the network 120) connected thereto to facilitate data communications. In some embodiments, the COM ports 250 may transmit to and receive information or data from any one of the modules of the server device 140 and/or the client terminal(s) 130. In some embodiments, the COM ports 250 may include a wired port (e.g., a Universal Serial Bus (USB) port, a High Definition Multimedia Interface (HDMI) port, etc.) or a wireless port (a Bluetooth port, an infrared interface, a WiFi port, etc.).

The computing device 200 may also include a processor 220 (e.g., a central processing unit (CPU), a graphics processing unit (GPU), etc.), in the form of one or more processors, for executing computing instructions. Computing instructions may include routines, programs, objects, components, data structures, procedures, modules, and functions, which perform particular functions described herein. In some embodiments, the processor 220 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, the processor 220 may include a microcontroller to process data (e.g., scanning data) from the medical device 110 (e.g., a CT scanner) for image reconstruction.

The computing device 200 may also include an internal communication bus 210, program storage and data storage of different forms, for example, a disk 270, and a read only memory (ROM) 230, or a random access memory (RAM) 240, for various data files to be processed and/or transmitted by the computer. The disk 270 may include, for example, a floppy disk, an optical disk, a zip disk, etc. The ROM 230 may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. The RAM 240 may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. In some embodiments, the computing device 200 may also include program instructions stored in the ROM 230, the RAM 240, and/or another type of non-transitory storage medium to be executed by the processor 220. The methods and/or processes of the present disclosure may be implemented as the program instructions. The computing device 200 may also include an I/O 260, supporting input/output between the computer and other components therein. The computing device 200 may also receive programs and data via network communications.

Merely for illustration, only one processing unit and/or processor is described in the computing device 200. However, it should be noted that the computing device 200 in the present disclosure may also include multiple processing units and/or processors, thus operations and/or method steps that are performed by one processing unit and/or processor as described in the present disclosure may also be jointly or separately performed by the multiple processing units and/or processors. For example, the processing unit and/or processor of the computing device 200 executes both operation A and operation B. As in another example, operation A and operation B may also be performed by two different processing units and/or processors jointly or separately in the computing device 200 (e.g., the first processor executes operation A, and the second processor executes operation B; or the first and second processors jointly execute operations A and B).

Figure 3:
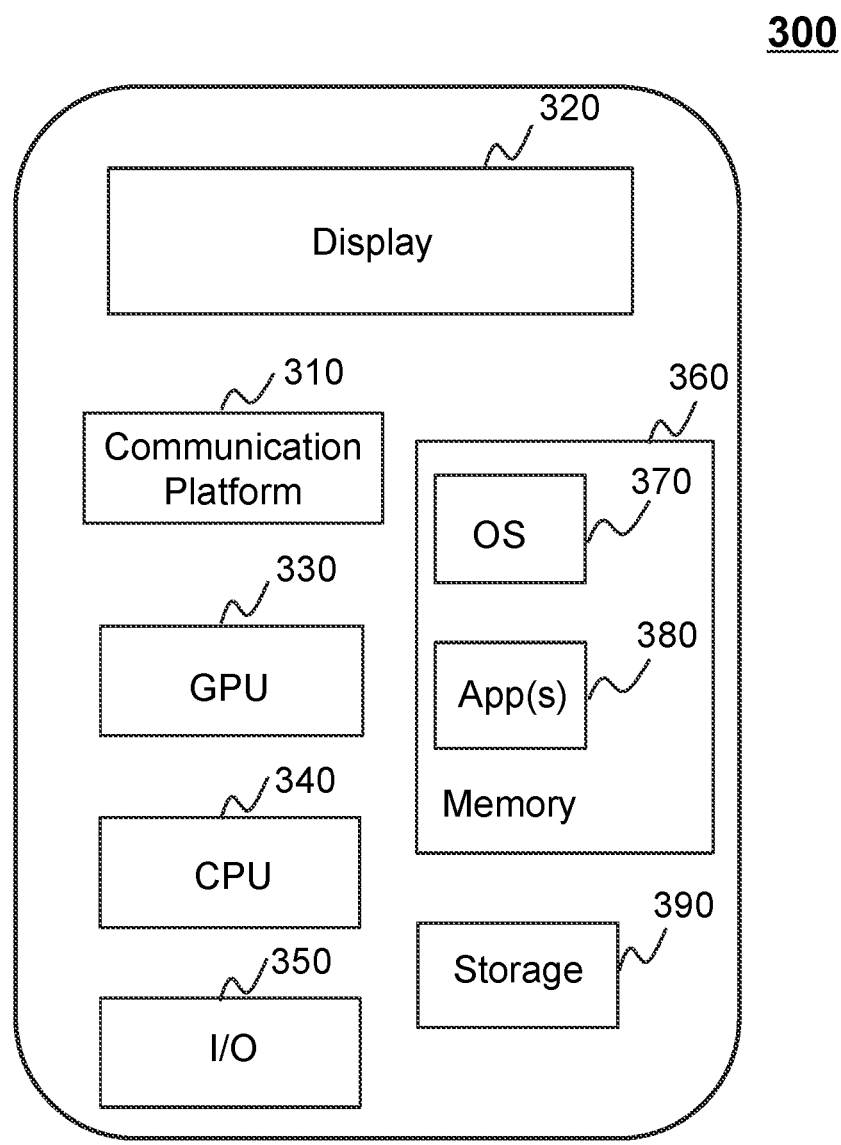
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device according to some embodiments of the present disclosure. In some embodiments, the server device 140 and/or the client terminal(s) 130 may be implemented on the mobile device 300 and configured to perform functions thereof disclosure in the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340 and/or the GPU 330. The applications 380 may include a browser or any other suitable mobile apps for receiving and rendering information relating to image processing or other information in the server device 140 and/or the client terminal(s) 130. User interactions with the information stream may be achieved via the I/O 350 and provided to other components of the medical system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
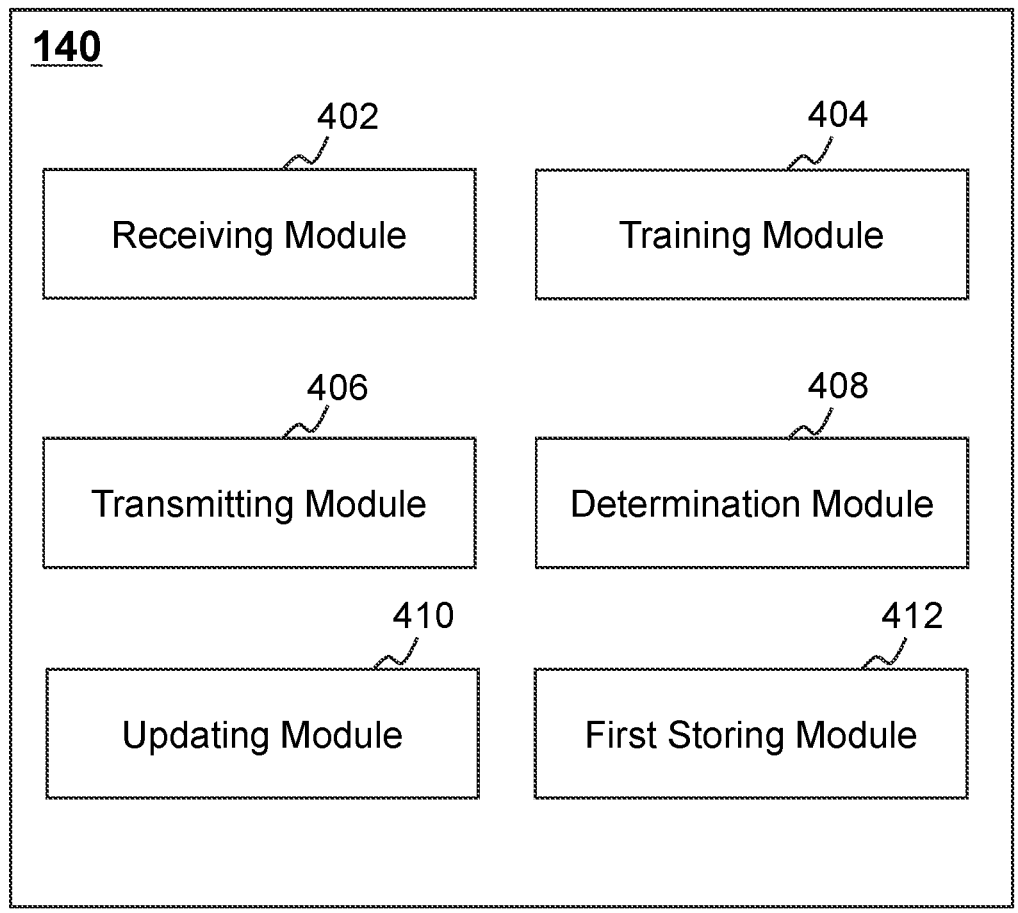
FIG. 4 is a block diagram illustrating an exemplary server device according to some embodiments of the present disclosure.

FIG. 4 is a block diagram illustrating an exemplary server device according to some embodiments of the present disclosure. In some embodiments, the server device 140 may be implemented on the computing device 200 and/or the mobile device 300. As illustrated in FIG. 4, the server device 140 may include a receiving module 402, a training module 404, a transmitting module 406, a determination module 408, an updating module 410, and a first storing module 412.

The receiving module 402 may be configured to receive information and/or data (e.g., scanning data, image data) from the at least one client terminal (e.g., the client terminal(s) 130). In some embodiments, the receiving module 402 may receive a plurality of first training samples from at least one client terminal via a network (e.g., the network 120). Each of the plurality of first training samples may include a first initial image and a first processed image with respect to the first initial image. The first processed image may exhibit a higher quality than the first initial image. In some embodiments, the receiving module 402 may receive the plurality of first training samples from two or more client terminals at different time periods or at the same time period. For example, the receiving module 402 may receive a portion of the plurality of first training samples from a first client terminal at a first time period (or a current time period), and receive another portion of the plurality of first training samples from a second client terminal at a second time period (or a prior time period). As another example, the receiving module 402 may receive a portion of the plurality of first training samples from a first client terminal and another portion of the plurality of first training samples from a second client terminal at the same time period.

In some embodiments, the receiving module 402 may receive a test result relating to a neural network model from the at least one client terminal via the network (e.g., the network 120). Merely by way of example, the receiving module 402 may receive a first test result relating to a second neural network model from the at least one client terminal. The second neural network model may be generated by training a first neural network model using the plurality of first training samples. In some embodiments, the first test result of the second neural network model may include a first evaluation score of the second neural network model. The first evaluation score of the second neural network model may be determined by evaluating one or more first test images according to one or more quality parameters relating to the one or more first test images. As another example, the receiving module 402 may receive a second test result for a target neural network model from the at least one client terminal. The target neural network model may be determined based on the first neural network model and/or the second neural network model. In some embodiments, the second test result of the target neural network model may include a second evaluation score of the target neural network model. The second evaluation score of the target neural network model may be determined by evaluating one or more second test images according to one or more quality parameters relating to the one or more second test images. Details regarding the determination of the (first or second) evaluation score of a neural network model (e.g., the second neural network model, the target neural network model) may be found elsewhere in the present disclosure (e.g., FIG. 8 and the descriptions thereof).

The training module 404 may be configured to train a preliminary neural network model (e.g., a first neural network model) based on the plurality of first training samples to generate a trained neural network model (e.g., a second neural network model). In some embodiments, the function of the second neural network model may depend on the plurality of first training samples. For example, if the plurality of first training samples include first initial images and first denoised images, the second neural network model may be used for image denoising. As another example, if the plurality of first training samples include first initial images and first enhanced images, the second neural network model may be used for image enhancement. More descriptions regarding the generation of the second neural network model may be found elsewhere in the present disclosure (e.g., operation 503 of the process 500 and the descriptions thereof).

The transmitting module 406 may be configured to transmit information and/or data to the at least one client terminal (e.g., the client terminal(s) 130) via the network (e.g., the network 120). In some embodiments, the transmitting module 406 may transmit the second neural network model to the at least one client terminal. In some embodiments, the transmitting module 406 may transmit the second neural network model to the at least one client terminal periodically, e.g., once a week, once a month, etc., or when the second neural network model is generated, or in response to a request to install or update the second neural network model from the at least one client terminal.

The determination module 408 may be configured to determine whether the first test result satisfies a first condition. In some embodiments, the determination module 408 may determine whether the first evaluation score of the second neural network model is greater than a first threshold. If the first evaluation score of the second neural network model is greater than the first threshold, the determination module 408 may determine that the first test result satisfies the first condition. In response to a determination that the first test result satisfies the first condition, the determination module 408 may determine the second neural network model as a target neural network model for image processing. Alternatively, in response to a determination that the first test result does not satisfy the first condition, the determination module 408 may determine the first neural network model as a target neural network model for image processing.

The updating module 410 may be configured to determine whether the target neural network model needs to be updated. In some embodiments, the updating module 410 may determine whether the second test result satisfies a second condition. If the updating module 410 determines that the second test result satisfies the second condition, the updating module 410 may determine that the target neural network model does not need to be updated. If the updating module 410 determines that the second test result does not satisfy the second condition, the updating module 410 may determine that the target neural network model needs to be updated. More descriptions regarding the updating of the target neural network model may be found elsewhere in the present disclosure (e.g., operation 517 of the process 500 and the descriptions thereof).

The first storing module 412 may be configured to store information and/or data generated during the process 500. For example, the first storing module 412 may store the first training samples received from the at least one client terminal. As another example, the first storing module 412 may store one or more neural network models (e.g., the first neural network model, the second neural network model, the target neural network model).

In some embodiments, the modules in the server device 140 may be connected to or communication with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or a combination thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, two or more of the modules may be combined into a single module. For example, the receiving module 402 and the transmitting module 406 may be integrated into one single module configured to perform the functions thereof.

FIG. 5 is a flowchart illustrating an exemplary process for determining a neural network model for image processing according to some embodiments of the present disclosure. In some embodiments, one or more operations of the process 500 may be implemented in the medical system 100 illustrated in FIG. 1. For example, the process 500 may be stored in the storage device 150 in the form of instructions (e.g., an application), and invoked and/or executed by the server device 140 (e.g., the server devices 142-1, 142-2, ..., 142-N as illustrated in FIG. 1B, the processor 220 of the computing device 200 as illustrated in FIG. 2, the CPU 340 of the mobile device 300 as illustrated in FIG. 3, one or more modules of the server device 140 as illustrated in FIG. 4, or the like). The operations of the illustrated process below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 501, the server device 140 (e.g., the receiving module 402) may receive a plurality of first training samples from at least one client terminal (e.g., the client terminal(s) 130) via a network (e.g., the network 120).

In some embodiments, each of the plurality of first training samples may include a first initial image and a first processed image with respect to the first initial image. The first processed image may exhibit a higher quality than the first initial image. As used herein, the quality of an image may be denoted by the noise level of the image, the artifact of the image, the contrast ratio of the image, the resolution of the image, or the like, or a combination thereof. In some embodiments, the first initial image and the first processed image may be generated based on the same scanning data (or projection data). For example, the first initial image and the first processed image may be reconstructed using two different reconstruction techniques, which may result in the difference of image quality. Exemplary reconstruction techniques may be found elsewhere in the present disclosure, and the descriptions thereof are not repeated herein. As another example, the first processed image may be generated by the at least one client terminal via processing the first initial image. For example, the first processed image may be generated by the at least one client terminal via processing the first initial image using a neural network model stored in the at least one client terminal. Details regarding the generation of the first training samples by the at least one client terminal may be found elsewhere in the present disclosure (e.g., FIG. 7 and the relevant descriptions thereof). Alternatively, each of the plurality of first training samples received from the at least one client terminal may include a first initial image. For each of the plurality of first training samples, the server device 140 may process a first initial image to obtain a first processed image. In some embodiments, the first processed image and the corresponding first initial image may constitute a first training sample. That is, the plurality of first training samples may be updated to include a plurality of first initial images received from the at least one client terminal and a plurality of first processed images generated by the server device 140.

In some embodiments, the processing of a first initial image may include image denoising, image enhancement, image super-resolution processing, image artifact removing, or the like, or any combination thereof. Merely by way of example, the server device 140 may generate the first processed image (also referred to as a first denoised image) by performing an image denoising operation on the first initial image using an image denoising algorithm. The first processed image may exhibit a lower noise level than the first initial image. Exemplary image denoising algorithms may include a Gaussian filtering, an anisotropic filtering (AF), a neighboring filtering, a total variation minimization, a kernel regression algorithm, a wavelet-based algorithm, a non-local-means (NL-means) algorithm, or the like. As another example, the server device 140 may generate the first processed image (also referred to as a first enhanced image) by performing an image enhancement operation on the first initial image using an image enhancement algorithm. The first enhanced image may have better contrast ratio with respect to the first initial image. In some embodiments, exemplary image enhancement algorithms may include a histogram equalization algorithm, a wavelet transform algorithm, a partial differential equation algorithm, a Retinex algorithm, or the like. As a further example, the server device 140 may generate the first processed image by processing the first initial image using an image super-resolution processing algorithm. The first processed image may exhibit a higher resolution than the first initial image. Exemplary image super-resolution processing algorithms may include a sparse representation algorithm, a self-exemplars algorithm, a Naïve Bayes algorithm, a deep learning algorithm, or the like. As a further example, the server device 140 may generate the first processed and/or optimized image by decreasing artifacts in the first initial image. The first processed image may exhibit less artifacts than the first initial image. In some embodiments, the artifacts may include aliasing artifacts, beam hardening artifacts, scattering artifacts, artifacts caused by partial volume effect, metal artifacts, ring artifacts, stair-step artifacts, cone beam artifacts, windmill artifacts, truncation artifacts, motion artifacts, or the like, or any combination thereof. Different kinds of artifacts may be removed according to its corresponding correction algorithms. For example, the scattering artifacts may be removed according to a scattering correction algorithm, for example, a convolution algorithm, a model assessing algorithm, a deconvolution algorithm, a Monte Carlo simulation algorithm, a dual energy-window technique, or the like.

In some embodiments, the receiving module 402 may receive the plurality of first training samples from two or more client terminals at different time periods. For example, the receiving module 402 may receive a portion of the plurality of first training samples from a first client terminal at a first time period (or a current time period), and receive another portion of the plurality of first training samples from a second client terminal at a second time period (or a prior time period). Alternatively or additionally, the receiving module 402 may receive the plurality of first training samples from two or more client terminals at the same time period. For example, the receiving module 402 may receive a portion of the plurality of first training samples from a first client terminal and another portion of the plurality of first training samples from a second client terminal at the same time period.

In 503, the server device 140 (e.g., the training module 404) may train a first neural network model based on the plurality of first training samples to generate a second neural network model. In some embodiments, the function of the second neural network model may depend on the plurality of first training samples. For example, if the plurality of first training samples include first initial images and first denoised images, the second neural network model may be used for image denoising. As another example, if the plurality of first training samples include first initial images and first enhanced images, the second neural network model may be used for image enhancement.

In some embodiments, the first neural network model may be a preliminary neural network model. Alternatively or additionally, the preliminary neural network model may be a pre-trained neural network model for image processing, e.g., image denoising, image enhancement, image super-resolution processing, or image artifact removing, etc. In some embodiments, the pre-trained neural network model may be obtained by training a neural network model using training samples acquired by a medical device (e.g., the medical device 110) in a prior time period before a current time period. Thus, the pre-trained neural network model may need to be updated to be suitable for image processing at present.

Exemplary neural network models may include a convolutional neural network model (e.g., a multi-scale convolutional neural network model, a super-resolution convolutional neural network model, a denoising convolutional neural network model), a perceptron neural network model, a deep trust network model, a stack self-coding network model, a recurrent neural network model (e.g., a long short term memory (LSTM) neural network model, a hierarchical recurrent neural network model, a bi-direction recurrent neural network model, a second-order recurrent neural network model, a fully recurrent network model, an echo state network model, a multiple timescales recurrent neural network (MTRNN) model), or the like, or any combination thereof.

In some embodiments, the first neural network model may include one or more preliminary parameters. The preliminary parameter(s) may be adjusted and/or updated during the training of the first neural network model using a neural network training algorithm. Exemplary neural network training algorithms may include a back propagation algorithm, a gradient descent algorithm, a Newton's algorithm, a conjugate gradient algorithm, a Quasi-Newton algorithm, a Levenberg Marquardt algorithm, or the like, or any combination thereof.

In some embodiments, a first initial image may be inputted into the first neural network model to generate an actual output (also referred to as a first predict image). The first processed image with respect to the first initial image may be considered as a desired output. The training module 404 may compare the actual output (e.g., the first predict image) with the desired output (e.g., the first processed image) using a loss function. The loss function may measure a difference between the actual output and the desired output. During the training of the first neural network model, a plurality of iterations may be performed to adjust and/or update the preliminary parameter(s) of the first neural network model until a termination condition is satisfied. Exemplary termination conditions may include that an updated loss function with the updated parameter(s) obtained in an iteration is less than a predetermined threshold, that a certain iteration count of iterations are performed, that the loss function converges such that the differences of the values of the updated loss function obtained in consecutive iterations are within a threshold, etc. After the terminated condition is satisfied, the second neural network model may be determined based on the updated parameter(s).

In 505, the server device 140 (e.g., the transmitting module 406) may transmit the second neural network model to the at least one client terminal (e.g., the client terminal(s) 130) via the network (e.g., the network 120). In some embodiments, the transmitting module 406 may transmit the second neural network model to the at least one client terminal when the second neural network model is generated. Alternatively, the transmitting module 406 may transmit the second neural network model to the at least one client terminal periodically, e.g., once a week, once a month, etc. Alternatively, the training module 406 may transmit the second neural network model to the at least one client terminal in response to a request to install or update the second neural network model from the at least one client terminal.

In some embodiments, the transmitting module 406 may transmit the second neural network model to one or more client terminals via the network. For example, the transmitting module 406 may transmit the second neural network model to the at least one client terminal (e.g., the mobile device 130-1) via the network from which the plurality of first training samples are received and/or another client terminal (e.g., the laptop computer 130-3) that does not provide training samples to the server device 140.

In 507, the server device 140 (e.g., the receiving module 402) may receive a first test result of the second neural network model from the at least one client terminal (e.g., the client terminal(s)) via the network (e.g., the network 120). In some embodiments, the first test result of the second neural network model may include a first evaluation score of the second neural network model. The first evaluation score of the second neural network model may be determined by evaluating one or more first test images according to one or more quality parameters relating to the one or more first test images. The one or more first test images may be generated by the at least one client terminal via processing one or more second initial images using the second neural network model. The one or more quality parameters may include a noise level, a resolution, an artifact level, a contrast ratio, or the like. Details regarding the determination of the (first) evaluation score of a neural network model (e.g., the second neural network model) may be found elsewhere in the present disclosure (e.g., FIG. 8 and the descriptions thereof).

In 509, the server device 140 (e.g., the determination module 408) may determine whether the first test result satisfies a first condition. In some embodiments, the determination module 408 may determine whether the first evaluation score of the second neural network model is greater than a first threshold. The first threshold may be a default value of the medical system 100, or be set or adjusted by a user. If the first evaluation score of the second neural network model is greater than the first threshold, the determination module 408 may determine that the first test result satisfies the first condition. In some embodiments, in response to the determination that the test result satisfies the first condition, the server device 140 may receive the second initial images and the one or more test images via the network and update the plurality of first training samples with the received one or more second initial images and the one or more test images.

In response to a determination that the first test result satisfies the first condition, the process 500 may proceed to 511. In 511, the server device 140 (e.g., the determination module 408) may determine the second neural network model as a target neural network model for image processing. Alternatively, in response to a determination that the first test result does not satisfy the first condition, the process 500 may proceed to 513. In 513, the server device 140 (e.g., the determination module 408) may determine the first neural network model as a target neural network model for image processing. The server device 140 (e.g., the transmitting module 406) may transmit the target neural network model (i.e., the first neural network model or the second neural network model) to the at least one client terminal over the network.

In some embodiments, when the target neural network model implemented in the client terminal has been used for a period, the target neural network model may not be suitable for processing (initial) images at the present time due to changes of the system and/or external conditions. Thus, the target neural network model may need to be updated.

In 515, the server device 140 (e.g., the receiving module 402) may receive and/or obtain a second test result for the target neural network model from the at least one client terminal. In some embodiments, the second test result of the target neural network model may include a second evaluation score of the target neural network model. The second evaluation score of the target neural network model may be determined by evaluating one or more second test images according to one or more quality parameters relating to the one or more second test images. The one or more second test images may be generated by the at least one client terminal via processing one or more third initial images using the target neural network model. The one or more quality parameters may include a noise level, a resolution, an artifact level, a contrast ratio, or the like. Details regarding the determination of the (second) evaluation score of a neural network model (e.g., the target neural network model) may be found elsewhere in the present disclosure (e.g., FIG. 8 and the descriptions thereof).

In some embodiments, the receiving module 402 may obtain the second test result for the target neural network model periodically, for example, once a week, once a month, once a half year, or the like. Alternatively, the receiving module 402 may obtain the second test result for the target neural network model in response to a request to update the target neural network model received from the at least one client terminal. In some embodiments, the request may be entered into the at least one client terminal by a user, or may be default settings of the client terminal(s).

In 517, the server device 140 (e.g., the updating module 410) may determine whether the target neural network model needs to be updated. In some embodiments, the updating module 410 may determine whether the second test result satisfies a second condition. If the updating module 410 determines that the second test result satisfies the second condition, the updating module 410 may determine that the target neural network model does not need to be updated. If the updating module 410 determines that the second test result does not satisfy the second condition, the updating module 410 may determine that the target neural network model needs to be updated. In some embodiments, the second condition may be the same as or different from the first condition. Specifically, the updating module 410 may determine whether the second evaluation score of the target neural network model is greater than a second threshold. The second threshold may be a default value of the medical system 100, or be set or adjusted by a user. In some embodiments, the second threshold may be the same as or different from the first threshold. If the second evaluation score of the target neural network model is greater than the second threshold, the updating module 410 may determine that the second test result satisfies the second condition, that is, the target neural network model does not need to be updated. In response to a determination that the target neural network model does not need to be updated, the process 500 may proceed to 519. In 519, the server device 140 may update the first neural network model using the target neural network model. The server device 140 may further store the target neural network model in the first storing module 412.

Alternatively, if the second evaluation score of the target neural network model is less than or equal to the second threshold, the updating module 410 may determine that the second test result does not satisfy the second condition, that is, the target neural network model needs to be updated. In response to a determination that the target neural network model needs to be updated, the process 500 may update the plurality of first training samples and proceed to perform operations 501 through 513. In 501, the server device 140 (e.g., the receiving module 402) may obtain and/or receive the plurality of first training samples. The plurality of first training samples may be updated using a plurality of second training samples. For example, the plurality of second training samples may be added in the plurality of first training samples. As another example, at least one portion of the plurality of first training samples may be replaced by the plurality of second training samples. In some embodiments, the plurality of second training samples may include at least one portion of the plurality of first training samples. Alternatively, each of the plurality of second training samples may be different from one of the plurality of first training samples. The obtaining of the second training samples may be in a manner similar to that of the first training samples, and the descriptions thereof are not repeated. In 503, the server device 140 (e.g., the training module 404) may train the first neural network model (i.e., the target neural network model) using the plurality of first training samples (e.g., the second training samples) to obtain the second neural network model. The first neural network model may be updated using the target neural network model as described in operation 519. The second neural network model may be also referred to as a trained target neural network model. The training of the target neural network model may be in a manner similar to that of the first neural network model, and the descriptions thereof are not repeated. The process 500 may repeat operations 505 through 513, and the descriptions thereof are not repeated.

In the present disclosure, since a server device (e.g., the server device 140) has a stronger computing capacity than the client terminal, the training of a neural network model (e.g., the first neural network model, the target neural network model, etc.) is performed via the server device (e.g., the server device 140), which may shorten the time of training the neural network model and may not occupy computing resources of the client terminal(s) 130. Further, the client terminal may store a plurality of images, which can be processed by the neural network model to generate a plurality of processed images (i.e., test images). The testing of the neural network model (e.g., the target neural network model, etc.) may be performed by the client terminal (e.g., the client terminal(s) 130) via evaluating one or more test images (processed images by the target neural network model), which may be convenient to test the neural network model and not occupy large computing resources of the client terminal(s) 130.

It should be noted that the above description of the process 500 is merely provided for the purposes of illustration, and not intended to limit the scope of the present disclosure. For persons having ordinary skills in the art, multiple variations and modifications may be made under the teachings of the present disclosure. In some embodiments, the target neural network model for image processing may further be used for image diagnosis, image identification, or the like. In some embodiments, operations 515 through 519 may be omitted.

Figure 6:
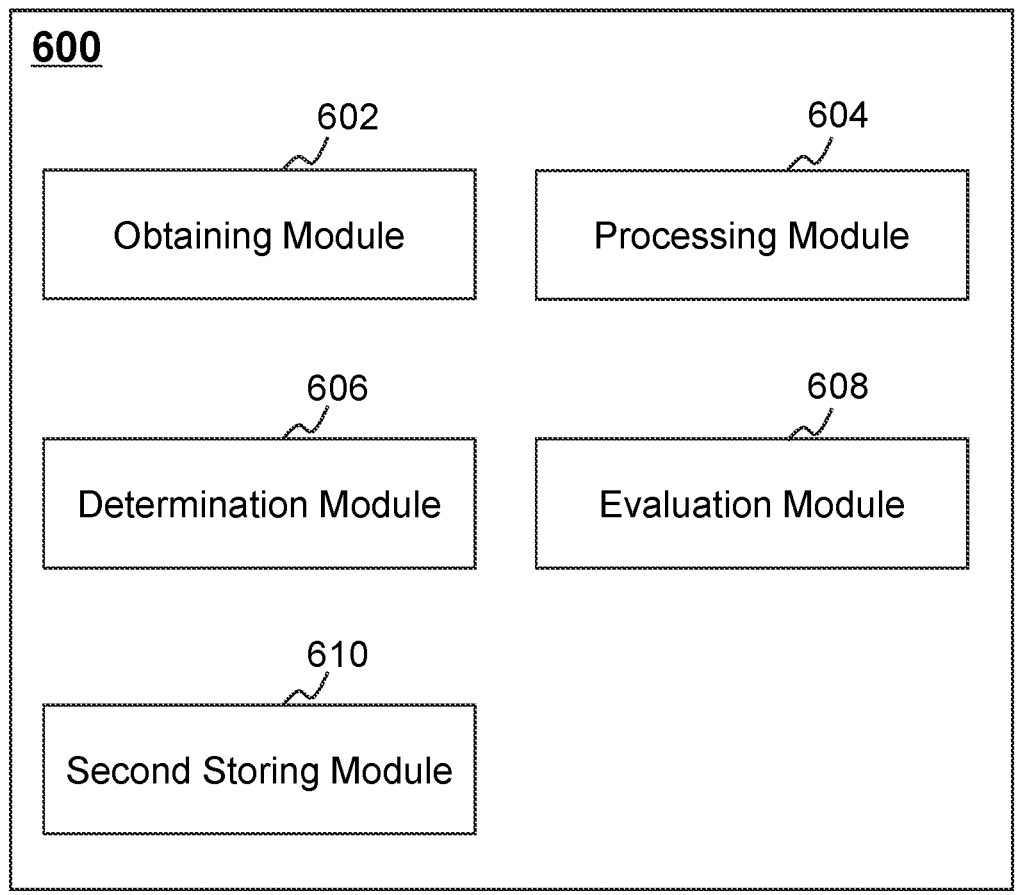
FIG. 6 is a block diagram illustrating an exemplary server device according to some embodiments of the present disclosure.

FIG. 6 is a block diagram illustrating an exemplary server device according to some embodiments of the present disclosure. In some embodiments, the server device 600 may be implemented on the client terminal 130 as illustrated in FIG. 1. As illustrated in FIG. 6, the server device 600 may include an obtaining module 602, a processing module 604, a determination module 606, an evaluation module 608, and a second storing module 610.

The obtaining module 602 may be configured to obtain information and/or data (e.g., scanning data, image data). In some embodiments, the obtaining module 602 may obtain a plurality of first initial images. In some embodiments, the first initial image may exhibit a first image quality. As used herein, the first image quality may be defined by one or more quality parameters of the first initial image, such as a noise level, a contrast ratio, a resolution, an artifact level, etc. In some embodiments, the obtaining module 602 may obtain one or more second initial images. In some embodiments, a second initial image may be similar to or the same as one of the plurality of first initial images. Alternatively, a second initial image may be different from any one of the plurality of first initial images. In some embodiments, the obtaining module 602 may obtain the (first and/or second) initial images from one or more components of the medical system 100, for example, the second storing module 610 of the client terminal 130, the medical device 110, the server device 140, a storage device (e.g., the storage device 150), etc. Alternatively or additionally, the obtaining module 602 may obtain the (first or second) initial images from an external source via the network 120, e.g., a medical database, picture archiving and communication system (PACS), etc.

In some embodiments, the obtaining module 602 may obtain a neural network model. The neural network model may include the first neural network model, the second neural network model, the target neural network model as described in FIG. 5. In some embodiments, the obtaining module 602 may obtain the neural network model from the second storing module 610 of the client terminal 130, the storage 390 of the mobile device 300, etc. In some embodiments, the obtaining module 602 may obtain the neural network model from the server device (e.g., the first storing module 410, the training module 404, the updating module 410, etc.). Alternatively, the obtaining module 602 may obtain the neural network model in response to a request to evaluate the neural network model.

The processing module 604 may be configured to generate a plurality of first processed images. Each of the plurality of first processed images may correspond to one of the plurality of first initial images. In some embodiments, a first processed image may exhibit a second image quality. The second image quality of the first processed image may be greater than the first image quality of a corresponding first initial image. In some embodiments, the processing module 604 may process a first initial images to obtain a corresponding first processed image. The processing of the first initial image may include image denoising, image enhancement, image super-resolution processing, image artifact removing, or the like, or any combination thereof. Alternatively or additionally, the processing module 604 may process the first initial image using a third neural network model for image processing, such as image denoising, image enhancement, image super-resolution processing, image artifact removing, etc.

In some embodiments, the processing module 604 may generate one or more test images by processing the one or more second initial images using the neural network model obtained by the obtaining module 602. In some embodiments, the processing module 604 may input a second initial image into the neural network model to generate a corresponding test image (also referred to second processed image). In some embodiments, a test image processed using the neural network model may have better quality relative to the corresponding second initial image.

The determination module 606 may be configured to designate the plurality of first initial images and the plurality of first processed images as a plurality of training samples. Each of the plurality of training samples may include a first initial image and a corresponding processed image.

The evaluation module 608 may be configured to evaluate one or more quality parameters relating to each of the one or more test images generated by the processing module 604. In some embodiments, the one or more quality parameters may include a noise level, a resolution, an artifact level, a contrast ratio, or the like, or any combination thereof. The quality of a test image may be assessed by evaluating the one or more quality parameters. In some embodiments, the quality of a test image may be denoted by a score determined by evaluating the one or more quality parameters of the test image. The higher the score of the test image is, the higher the quality of the test image may be.

The evaluation module 608 may also be configured to determine an evaluation score of the neural network model based on the evaluations of the one or more quality parameters relating to each of the one or more test images. In some embodiments, the evaluation module 608 may determine a score for each test image based on the one or more quality parameters of the test image. The evaluation module 608 may determine the evaluation score of the neural network model based on the scores of the one or more test images. More descriptions regarding the evaluation of the neural network model may be found elsewhere in the present disclosure (e.g., operations 807 and 809 of the process 800 and the descriptions thereof).

The second storing module 610 may be configured to store information and/or data generated or used during the processes 700 and 800. For example, the second storing module 610 may store the first training sample(s), the second initial image(s), and/or the test image(s). As another example, the second storing module 610 may store the neural network model to be evaluated (e.g., the first neural network model, the second neural network model, the target neural network model). As a further example, the second storing module 610 may store the quality parameter(s), the score of the neural network model, or the like.

In some embodiments, the modules in the server device 600 may be connected to or communication with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or a combination thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, any one of the modules may be divided into two or more units. For example, the obtaining module 602 may be divided into two units. A first unit may be configured to obtain training samples, and the second unit may be configured to obtain a neural network model from the server device.

Figure 7:
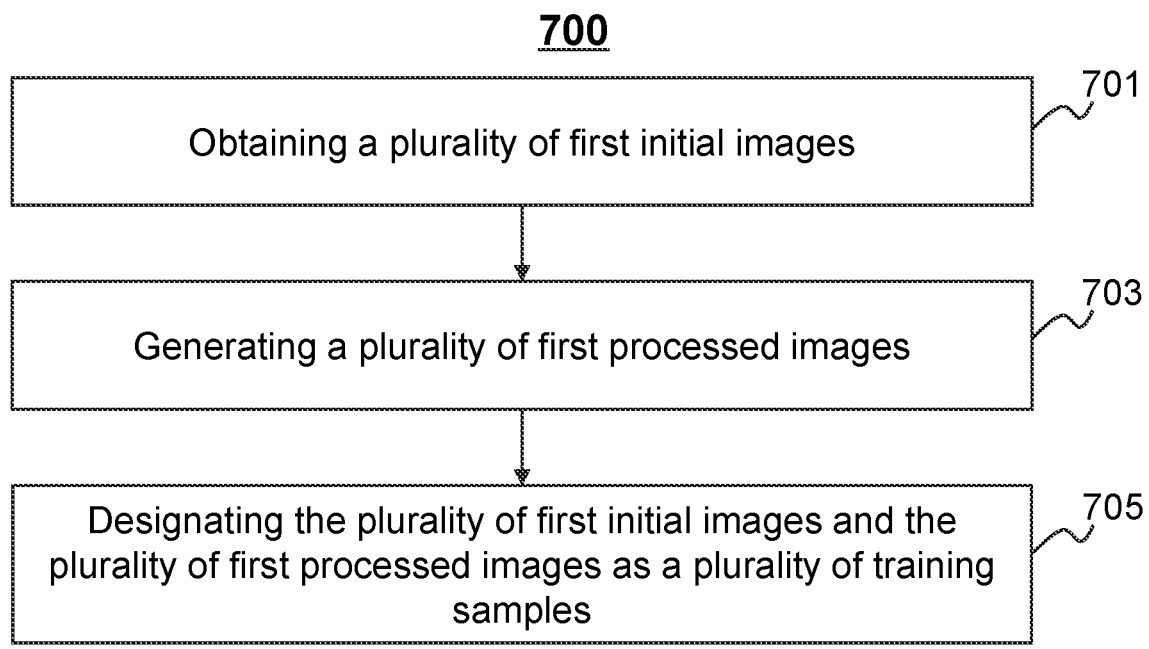
FIG. 7 is a flowchart illustrating an exemplary process for determining training sample(s) according to some embodiments of the present disclosure.

FIG. 7 is a flowchart illustrating an exemplary process for determining training sample(s) according to some embodiments of the present disclosure. In some embodiments, one or more operations of the process 700 may be implemented in the medical system 100 illustrated in FIG. 1. For example, the process 700 may be stored in the storage device 150 in the form of instructions (e.g., an application), and invoked and/or executed by the client terminal 130 (e.g., the processor 220 of the computing device 200 as illustrated in FIG. 2, the CPU 340 of the mobile device 300 as illustrated in FIG. 3, one or more modules of the server device 600 as illustrated in FIG. 6, or the like). The operations of the illustrated process below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, the plurality of first training samples and/or the plurality of second training samples described in connection with FIG. 5 may be generated according to process 700.

In 702, the server device 600 (e.g., the obtaining module 602) may obtain a plurality of first initial images. In some embodiments, a first initial image may include a two-dimensional (2D) image, a three-dimensional (3D) image, a four-dimensional (4D) image, or the like, or any combination thereof. A first initial image may be a CT image, an MRI image, a PET image, or the like, or a combination thereof.

In some embodiments, a first initial image may be reconstructed based on scanning data (e.g., projection data) acquired by a medical device (e.g., the medical device 110) using a first reconstruction technique. In some embodiments, the first reconstruction technique may include an iterative reconstruction technique, an analytical reconstruction technique, or the like, or a combination thereof. Exemplary iterative reconstruction techniques may include an algebraic reconstruction technique (ART), a simultaneous iterative reconstruction technique (SIRT), a simultaneous algebraic reconstruction technique (SART), an adaptive statistical iterative reconstruction (ASIR) technique, a model based iterative reconstruction (MAIR) technique, a sinogram affirmed iterative reconstruction (SAFIR) technique, or the like, or a combination thereof. Exemplary analytical reconstruction techniques may include applying an FDK algorithm, a Katsevich algorithm, or the like, or a combination thereof. In some embodiments, the first initial image may exhibit a first image quality. As used herein, the first image quality may be defined by one or more quality parameters of the first initial image, such as a noise level, a contrast ratio, a resolution, an artifact level, etc.

In some embodiments, the obtaining module 602 may obtain the plurality of first initial images from one or more components of the medical system 100, for example, the second storing module 610 of the client terminal 130, the medical device 110, the server device 140, a storage device (e.g., the storage device 150), etc. Alternatively or additionally, the obtaining module 602 may obtain the plurality of first initial images from an external source via the network 120, e.g., a medical database, picture archiving and communication system (PACS), etc.

In 704, the server device 600 (e.g., the processing module 604) may generate a plurality of first processed images. Each of the plurality of first processed images may correspond to one of the plurality of first initial images. In some embodiments, a first processed image may exhibit a second image quality. The second image quality of the first processed image may be greater than the first image quality of a corresponding first initial image. For example, a first processed image may be generated by performing an image denoising operation on a corresponding first initial image. The first processed image may include less noises than the corresponding first initial image. As another example, a first initial image may be generated by performing an image enhancement on a corresponding first processed image. The contrast ratio of the first processed image may be higher than that of the corresponding first initial image.

In some embodiments, the first processed image may be reconstructed based on the scanning data (e.g., projection data) associated with the corresponding first initial image using a second reconstruction technique. In some embodiments, the first reconstruction technique may be different from the second reconstruction technique. The second image quality of the first processed image and the first image quality of the corresponding first initial image reconstructed based on the same scanning data but different reconstruction techniques may be different. For example, the noise level of the first initial image reconstructed using an analytical reconstruction technique may be higher than that of the first processed image reconstructed using an iterative reconstruction technique. In some embodiments, the first reconstruction technique may be same as the second reconstruction technique. The second image quality of the first processed image and the first image quality of the corresponding first initial image reconstructed based on the same image data and the same reconstruction technique but different reconstruction parameters may be different. For example, the noise level of a first initial image reconstructed using a smaller slice thickness, a smaller reconstruction matrix, a larger FOV, etc., may be higher than that of a corresponding first processed image reconstructed based on a same reconstruction technique using a larger slice thickness, a larger reconstruction matrix, a smaller FOV, etc.

In some embodiments, the processing module 604 may process a first initial image to obtain a corresponding first processed image. The processing of the first initial image may include image denoising, image enhancement, image super-resolution processing, image artifact removing, or the like, or any combination thereof. Details regarding the processing of the first initial image(s) may be found elsewhere in the present disclosure (e.g., operation 501 of the process 500 and the descriptions thereof). Alternatively or additionally, the processing module 604 may process the first initial image using a third neural network model for image processing, such as image denoising, image enhancement, image super-resolution processing, image artifact removing, etc. In some embodiments, the third neural network model may be configured to convert a first initial image to a corresponding first processed image. In some embodiments, the third neural network model may be a configured neural network model stored in the client terminal(s) when the client terminal(s) is installed. The obtaining module 602 may obtain the neural network model from the second storing module 610 of the client terminal 130, the storage 390 of the mobile device 300, etc. In some embodiments, the obtaining module 602 may obtain the neural network model (e.g., the target neural network model as described in FIG. 5) from the server device (e.g., the first storing module 412, the training module 404, the updating module 410, etc.).

In 706, the server device 600 (e.g., the determination module 606) may designate the plurality of first initial images and the plurality of first processed images as a plurality of training samples. Each of the plurality of training samples may include a first initial image and a corresponding processed image. In some embodiments, the training samples may be used as the first training samples to train the first neural network model as described in connection with FIG. 5. Alternatively, the training samples may be used as the second training samples to train the target neural network model when the target neural network model needs to be updated as described in connection with FIG. 5.

It should be noted that the above description of the process of allocating computing resources for medical applications in response to requests for performing the medical applications is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the first initial image(s) may have better quality than the first processed image(s). For example, a first initial image may be an image generated with high dosages, which includes few noises. The processing module 604 may process the first initial image to generate a first processed image, which may includes more noises than the first initial images. Then the first initial image and the first processed image may constitute a training sample.

Figure 8:
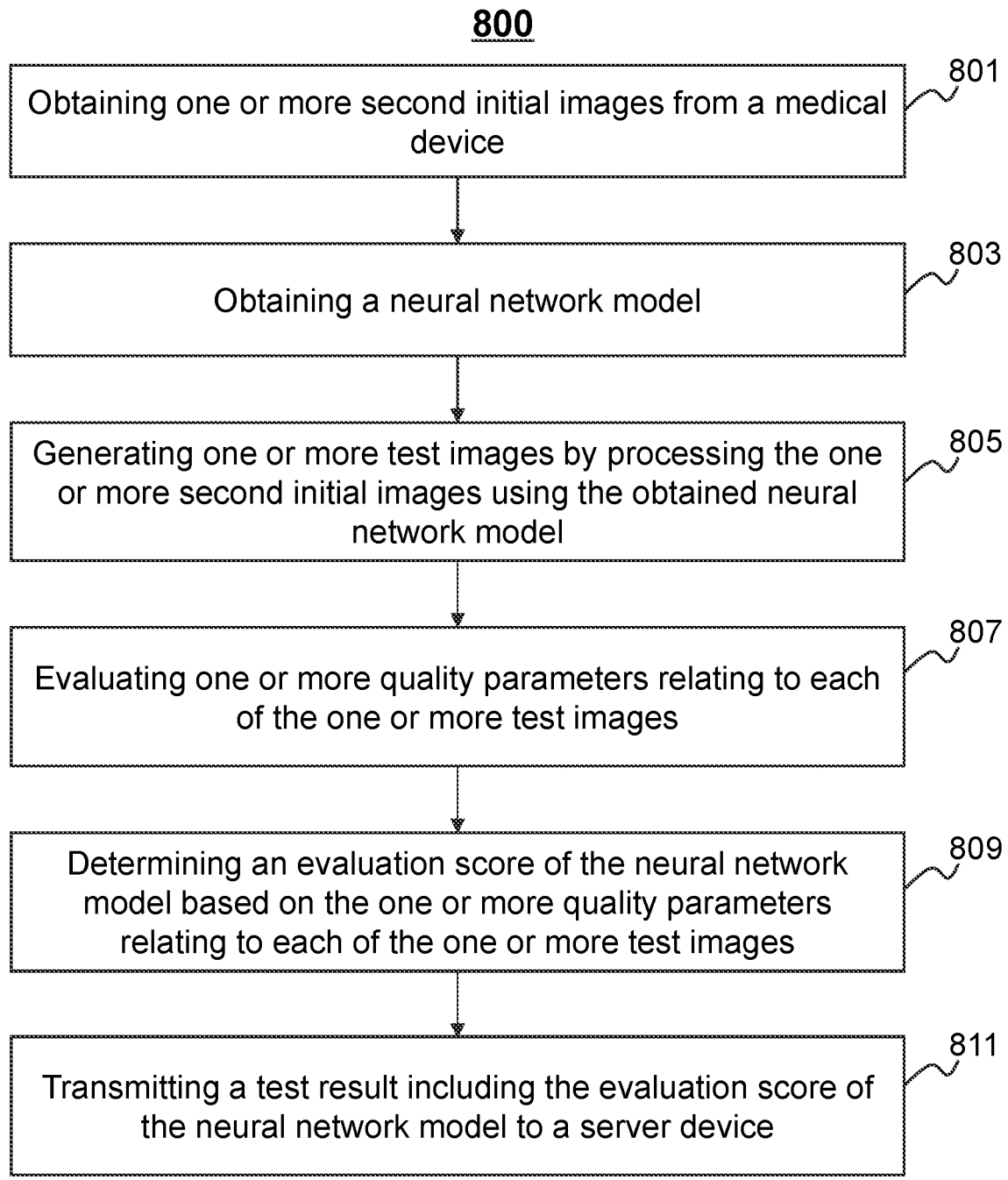
FIG. 8 is a flowchart illustrating an exemplary process for testing a neural network model according to some embodiments of the present disclosure.

FIG. 8 is a flowchart illustrating an exemplary process for testing a neural network model according to some embodiments of the present disclosure. In some embodiments, one or more operations of the process 800 may be implemented in the medical system 100 illustrated in FIG. 1. For example, the process 800 may be stored in the storage device 150 in the form of instructions (e.g., an application), and invoked and/or executed by the client terminal 130 (e.g., the processor 220 of the computing device 200 as illustrated in FIG. 2, the CPU 340 of the mobile device 300 as illustrated in FIG. 3, one or more modules of the server device 600 as illustrated in FIG. 6, or the like). The operations of the illustrated process below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, the first test result of the second neural network model as described in 507 and/or the second test result of the target neural network model as described in 515 illustrated in FIG. 5 may be determined according to process 800.

In 801, the server device 600 (e.g., the obtaining module 602) may obtain one or more second initial images. Operation 801 may be performed in a manner similar to operation 701 of the process 700, and the descriptions thereof are not repeated here. In some embodiments, a second initial image may be similar to or the same as one of the plurality of first initial images as described in FIG. 7. For example, a second initial image may be a two-dimensional (2D) image, a three-dimensional (3D) image, a four-dimensional (4D) image, or the like, or any combination thereof. As another example, a second initial image may be a CT image, an MR image, a PET image, etc. As still an example, a second initial image may be one of the plurality of first initial images as descried in FIG. 7. In some embodiments, a second initial image may be different from any one of the plurality of first initial images as described in FIG. 7. For example, the second initial image may be reconstructed based on projection data acquired by the medical device 110 via scanning a first subject at a current time period. The plurality of first initial images may be reconstructed based on projection data acquired by the medical device 110 via scanning a second subject at a prior time period. The first subject and the second subject may be the same or different.

In 803, the server device 600 (e.g., the obtaining module 602) may obtain a neural network model. In some embodiments, the neural network model may be a trained neural network model for image processing, e.g., image denoising, image enhancement, image super-resolution processing, image artifact removing, etc. For example, the neural network model may be the first neural network model, the second neural network model, or the target neural network model as described in FIG. 5. In some embodiments, the obtaining module 602 may obtain the neural network model from the second storing module 610 of the client terminal 130, the storage 390 of the mobile device 300, etc. In some embodiments, the obtaining module 602 may obtain the neural network model from the server device (e.g., the first storing module 410, the training module 404, the updating module 410, etc.). Alternatively, the obtaining module 602 may obtain the neural network model in response to a request to evaluate the neural network model.

In 805, the server device 600 (e.g., the processing module 604) may generate one or more test images by processing the one or more second initial images using the obtained neural network model. In some embodiments, the processing module 604 may input a second initial image into the neural network model to generate a corresponding test image (also referred to second processed image). In some embodiments, a test image processed using the neural network model may have better quality relative to the corresponding second initial image. For example, if the neural network model is configured to denoise an image, the test image processed using the neural network model may exhibit a lower noise level than the second initial image. As another example, if the neural network model is configured to enhance an image, the test image processed using the neural network model may exhibit a higher contrast ratio than the second initial image. As still an example, if the neural network model is configured to decrease artifacts presented in an image, the test image processed using the neural network model may exhibit less artifacts than the second initial image. As still an example, if the neural network model is configured to improve resolution of an image, the test image processed using the neural network model may exhibit a higher resolution than the second initial image.

In 807, the server device 600 (e.g., the evaluation module 608) may evaluate one or more quality parameters relating to each of the one or more test images. In some embodiments, the one or more quality parameters may include a noise level, a resolution, an artifact level, a contrast ratio, or the like, or any combination thereof. The quality of a test image may be assessed by evaluating the one or more quality parameters. For example, the lower the noise level of a test image is, the higher the quality of the test image may be. As another example, the lower the noise level of a test image is, and the less artifacts presented in the test image is, the higher the quality of the test image may be. As still an example, the higher the contrast ratio of a test image is, the higher the resolution of the test image is, the lower the noise level of the test image is, and/or the less artifacts presented in the test image is, the higher the quality of the test image may be. In some embodiments, the quality of a test image may be denoted by a score determined by evaluating the one or more quality parameters of the test image. The higher the score of the test image is, the higher the quality of the test image may be. In some embodiments, the evaluation module 608 may evaluate the one or more quality parameters relating to each of the one or more test images using an image quality assessment technique, such as an analytic hierarchy process (AHP) algorithm, a mean squared error (MSE) algorithm, a peak signal to noise rate (PSNR) algorithm, a structural similarity (SSIM) algorithm, etc.

Merely be way of example, using the AHP algorithm to evaluate a test image, each of the one or more quality parameters may be given a score level (e.g., ranging from 1 to 5). For example, the score level of the noise level of the test image may be 4, the score level of the resolution of the test image may be 4, and the score level of the artifact level of the test image may be 5. The score level of the quality parameter(s) may be determined by a user or according to a quality evaluation model (e.g., a convolution neural network model). The evaluation module 608 may further determine a weight for each quality parameter relating to the test image according to a default setting of the medical system 100 or an instruction of the user. The evaluation module 608 may determine a score of the test image based on the score levels and the corresponding weights of the one or more quality parameters.

In 809, the server device 600 (e.g., the evaluation module 608) may determine an evaluation score of the neural network model based on the evaluations of the one or more quality parameters relating to each of the one or more test images. In some embodiments, the evaluation module 608 may determine a score for each test image based on the one or more quality parameters of the test image. The evaluation module 608 may determine the evaluation score of the neural network model based on the scores of the one or more test images. For example, the evaluation module 608 may determine a reference value based on the scores of the one or more test images as the evaluation score of the neural network model. In some embodiments, the reference value may include an average value of the scores of the one or more test images, a median of the scores of the one or more test images, a variance of the scores of the one or more test images, a standard deviation of the scores of the one or more test images, a minimum of the scores of the one or more test images, a maximum of the scores of the one or more test images, or other values from the scores of the one or more test images.

In 811, the server device 600 may transmit a test result of the neural network model including the evaluation score of the neural network model to a server device (e.g., the server device 140). In some embodiments, the test result of the neural network model may be denoted by the evaluation score of the neural network model. In some embodiments, the neural network model may be ranked based on the evaluation score of the neural network model into, for example, "A", "B", "C", etc. For example, if the evaluation score of the neural network model is in a first range, the neural network model may be ranked into "A." If the evaluation score of the neural network model is in a second range, the neural network model may be ranked into "B." An evaluation score in the first range may be greater than an evaluation score in the second range. The test result of the neural network model may be denoted by the rank of the neural network model.

It should be noted that the above description of the process of allocating computing resources for medical applications in response to requests for performing the medical applications is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 801 and 803 may be performed simultaneously. As another example, operation 803 may be performed before operation 801. As still an example, operation 811 may be omitted.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system for generating a neural network model for image processing by interacting with at least one client terminal, comprising:
   a network configured to facilitate communication of at least one server device in the system and the at least one client terminal, wherein
   the at least one server device each of which includes at least one processor and at least one storage device storing a set of instructions, the at least one processor being in communication with the at least one storage device, wherein when executing the set of instructions, the at least one processor is configured to cause the system to:
      receive, via the network, a plurality of first training samples from at least one first client terminal among the at least one client terminal, wherein each of the plurality of first training samples includes a first initial image and a first processed image with respect to the first initial image, the first processed image being generated by the at least one client terminal via processing the first initial image using a third neural network model; and train a first neural network model based on the plurality of first training samples to generate a second neural network model.

2. The system of claim 1, wherein the at least one processor is further configured to cause the system to:

transmit, via the network, the second neural network model to at least one second client terminal among the at least one client terminal.

3. The system of claim 2, wherein the at least one first client terminal and the at least one second client terminal are the same or different client terminals.

4. The system of claim 2, wherein the at least one processor is further configured to cause the system to:

receive via the network, a first test result of the second neural network model from the at least one second client terminal; and determine the second neural network model as a target neural network model for image processing in response to a determination that the first test result satisfies a first condition.

5. The system of claim 4, wherein the first test result of the second neural network model includes an evaluation score of the second neural network model, and the at least one processor is further configured to cause the system to:

determine whether the evaluation score of the second neural network model is greater than a threshold; and determine that the first test result satisfies the first condition in response to a determination that the evaluation score of the second neural network model is greater than the threshold.

6. The system of claim 5, wherein the evaluation score of the second neural network model is determined by evaluating one or more first test images according to one or more quality parameters relating to each of the one or more test images, wherein the one or more test images are generated by the at least one second client terminal via processing one or more second initial images using the second neural network model, and the one or more quality parameters include at least one of a noise level, a resolution, a contrast ratio, or an artifact level.

7. The system of claim 6, wherein the at least one processor is further configured to cause the system to:

receive, via the network, the one or more second initial images and the one or more test images from the at least one second client terminal in response to the determination that the test result satisfies the first condition; and update the plurality of first training samples with the received one or more second initial images and the one or more test images.

8. The system of claim 4, wherein the at least one processor is further configured to cause the system to:

in response to a determination that the first test result does not satisfy the first condition, determine the first neural network model as the target neural network model for image processing.

9. The system of claim 8, wherein the at least one processor is further configured to cause the system to:

transmit the target neural network model to the at least one first client terminal over the network.

10. The system of claim 2, the at least one processor is further configured to cause the system to:

obtain a second test result for the target neural network model from the at least one second client terminal;

determine whether the target neural network model needs to be updated based on the second test result; and train the target neural network model using a plurality of second training samples to obtain a trained target neural network model in response to a determination that the second test result of the target neural network model does not satisfy a second condition.

11. The system of claim 10, wherein the at least one processor is further configured to cause the system to:

obtain the second test result for the target neural network model periodically, or obtain the second test result for the target neural network model in response to a request to update the target neural network model received from the at least one second client terminal.

12. The system of claim 1, wherein the at least one server device includes at least two server devices, and the at least two server devices are connected to the network through a distributed connection, and the at least one processor of each server device is configured to train the first neural network model based on the plurality of first training samples.

13. A system for generating a neural network model for image processing, comprising:

at least one client terminal;

at least one server device; and a network configured to facilitate communication between the at least one client terminal and at least one server device in the system; wherein the at least one server device includes at least one processor and at least one storage device storing a set of instructions, the at least one processor being in communication with the at least one storage device, wherein when executing the set of instructions, the at least one processor is configured to cause the system to:

receive, by the at least one processor, a plurality of first training samples from at least one first client terminal among the at least one client terminal;

train, by the at least one processor, a first neural network model using the plurality of first training samples to generate a second neural network model;

transmit, by the at least one processor, the second neural network model to at least one second client terminal of the at least one client terminal;

generate, by the at least one second client terminal, a first test result of the second neural network model received from the at least one server device; and determine, by the at least one processor, the second neural network model as a target neural network model for image processing in response to a determination that the first test result satisfies a first condition.

14. The system of claim 13, wherein the at least one first client terminal and the at least one second client terminal are the same or different client terminals.

15. The system of claim 13, wherein the at least one server device includes at least two server devices, and the at least two server devices are connected to the network through a distributed connection, and the at least one processor of each server device is configured to train the first neural network model based on the plurality of first training samples.

16. The system of claim 13, wherein the at least one processor is configured to cause the system to:

obtain, by the at least one first client terminal, a plurality of first initial images from a first medical device;

generate, by the at least one first client terminal or the at least one processor, a plurality of first processed images based on the plurality of first initial images using a third neural network model; and designate, by the at least one first client terminal or the at least one processor, the plurality of first initial images and the plurality of first processed images as the plurality of first training samples.

17. The system of claim 13, wherein the first test result of the second neural network model includes an evaluation score of the second neural network model, and the at least one processor is further configured to cause the system to:

determine, by the at least one processor, whether the evaluation score of the second neural network model is greater than a threshold; and determine, by the at least one processor, that the first test result satisfies the first condition in response to a determination that the evaluation score of the second neural network model is greater than the threshold.

18. The system of claim 17, wherein the evaluation score of the second neural network model is determined by evaluating one or more first test images according to one or more quality parameters relating to each of the one or more test images, and to generate a first test result relating to the second neural network model, the at least one processor is configured to cause the system to:

obtain, by the at least one second client terminal, one or more second initial images from a second medical device;

generate, by the at least one second client terminal, the one or more test images by processing the one or more second initial images using the second neural network model; and evaluate, by the at least one second client terminal, the one or more quality parameters relating to each of the one or more test images to obtain the evaluation score of the second neural network model, wherein the one or more quality parameters includes at least one of a noise level, a resolution, a contrast ratio, or an artifact level.

19. The system of claim 18, wherein the at least one processor is further configured to cause the system to:

receive, by the at least one processor, the one or more second initial images and the one or more test images from the at least one second client terminal in response to the determination that the first test result satisfies the first condition; and update, by the at least one processor, the plurality of first training samples with the received one or more second initial images and the one or more test images.

20. A method for generating a neural network model for image processing by interacting with at least one client terminal implemented on a computing device having one or more processors and a computer-readable storage medium, the method comprising:

receiving, via a network, a plurality of first training samples from at least one first client terminal among the at least one client terminal, wherein each of the plurality of first training samples includes a first initial image and a first processed image with respect to the first initial image, the first processed image being generated by the at least one client terminal via processing the first initial image using a third neural network model; and training a first neural network model based on the plurality of first training samples to generate a second neural network model.

* * * * *